(12) United States Patent
Dong et al.

(10) Patent No.: US 10,817,775 B2
(45) Date of Patent: Oct. 27, 2020

(54) NEURAL NETWORK COMPUTING SYSTEMS FOR PREDICTING VEHICLE REQUESTS

(71) Applicant: INTERNATIONAL BUSINESS MACHINES CORPORATION, Armonk, NY (US)

(72) Inventors: Wei Shan Dong, Beijing (CN); Peng Gao, Beijing (CN); Chang Sheng Li, Beijing (CN); Wei Sun, Beijing (CN); Renjie Yao, Beijing (CN); Ting Yuan, Beijing (CN); Jun Zhu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 581 days.

(21) Appl. No.: 15/404,483

(22) Filed: Jan. 12, 2017

(65) Prior Publication Data

US 2018/0197070 A1    Jul. 12, 2018

(51) Int. Cl.
*G06N 3/04* (2006.01)
*G08G 1/00* (2006.01)
*G06Q 30/02* (2012.01)

(52) U.S. Cl.
CPC ....... *G06N 3/0454* (2013.01); *G06Q 30/0202* (2013.01); *G08G 1/202* (2013.01); *G06N 3/0445* (2013.01)

(58) Field of Classification Search
CPC ..... G06N 3/0454; G06N 3/0445; G08G 1/202
See application file for complete search history.

(56) References Cited

U.S. PATENT DOCUMENTS

| 8,560,361 | B2 | 10/2013 | Shang et al. | |
|---|---|---|---|---|
| 9,349,150 | B2 | 5/2016 | Chidlovskii | |
| 9,760,806 | B1* | 9/2017 | Ning | B60W 50/14 |
| 2014/0089036 | A1 | 3/2014 | Chidlovskii | |
| 2016/0225262 | A1* | 8/2016 | Edakunni | G06Q 10/04 |
| 2017/0330086 | A1* | 11/2017 | Doh | G06N 5/022 |

OTHER PUBLICATIONS

Zeng et al., Improving Demand Prediction in Bike Sharing System by Learning Global Features, Aug. 14, 2016, KDD 2016, p. 1-11 (Year:2016).*

(Continued)

*Primary Examiner* — Eric Nilsson
*Assistant Examiner* — Urmana Islam
(74) *Attorney, Agent, or Firm* — Cantor Colburn LLP; Joseph Petrokaitis

(57) ABSTRACT

Embodiments are described for minimizing a wait time for a rider after sending a ride request for a vehicle. An example computer-implemented method includes receiving a ride request, the request being for travel from a starting location to a zone in a geographic region during a specified timeslot. The method further includes predicting travel demand based on a number of ride requests in the zone during the specified timeslot. The method further includes requesting transport of one or more vehicles to the zone in response to the predicted number of ride requests when the travel demand is predicted to exceed a number of vehicles in the zone during the specified timeslot.

3 Claims, 14 Drawing Sheets

(56) References Cited

OTHER PUBLICATIONS

Lv et al., T-CONV: A Convolutional Neural Network for Multi-scale Taxi Trajectory Prediction, Nov. 23, 2016, ArXiv, p. 1-11 (Year: 2016).*

Fan, Yin, Xiangju Lu, Dian Li, and Yuanliu Liu. "Video-based emotion recognition using CNN-RNN and C3D hybrid networks." In Proceedings of the 18th ACM International Conference on Multimodal Interaction, pp. 445-450 (Year: 2016).*

Donahue, J., Anne Hendricks, L., Guadarrama, S., Rohrbach, M., Venugopalan, S., Saenko, K., & Darrell, T. (2015). Long-term recurrent convolutional networks for visual recognition and description. In Proceedings of the IEEE conference on computer vision and pattern recognition (pp. 2625-2634). (Year: 2015).*

List of IBM Patents or Patent Applications Treated as Related; (Appendix P), Filed Nov. 6, 2017; 2 pages.

* cited by examiner

NEURAL NETWORK COMPUTING SYSTEMS FOR PREDICTING VEHICLE REQUESTS

BACKGROUND

The present application relates to computing systems, and more specifically, to training neural network computing systems for predicting vehicle travel requests.

A general environment in which the invention operates is often referred to as a neural networks. Typical neural networks use layers of non-linear "hidden" units between inputs and outputs of the neural network. Each unit has a weight that is determined during learning, which is referred to as a training stage. In the training stage, a training set of data (for example, a training set of inputs each having a known output) is processed by the neural network. Thus, it is intended that the neural network learn how to provide an output for new input data by generalizing the information the neural network learns in the training stage from the training data. Generally, once learning is complete, a validation set is processed by the neural network to validate the results of learning. Finally, test data (for example, data for which generating an output is desired) can be processed by a validated neural network.

SUMMARY

According to one or more embodiments, a computer-implemented method for minimizing a wait time for a rider after sending a ride request for a vehicle. An example computer-implemented method includes receiving a ride request, the request being for travel from a starting location to a zone in a geographic region during a specified timeslot. The method further includes predicting travel demand based on a number of ride requests in the zone during the specified timeslot. The method further includes requesting transport of one or more vehicles to the zone in response to the predicted number of ride requests when the travel demand is predicted to exceed a number of vehicles in the zone during the specified timeslot.

Other embodiments include a system a computer program product.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Figure 1:
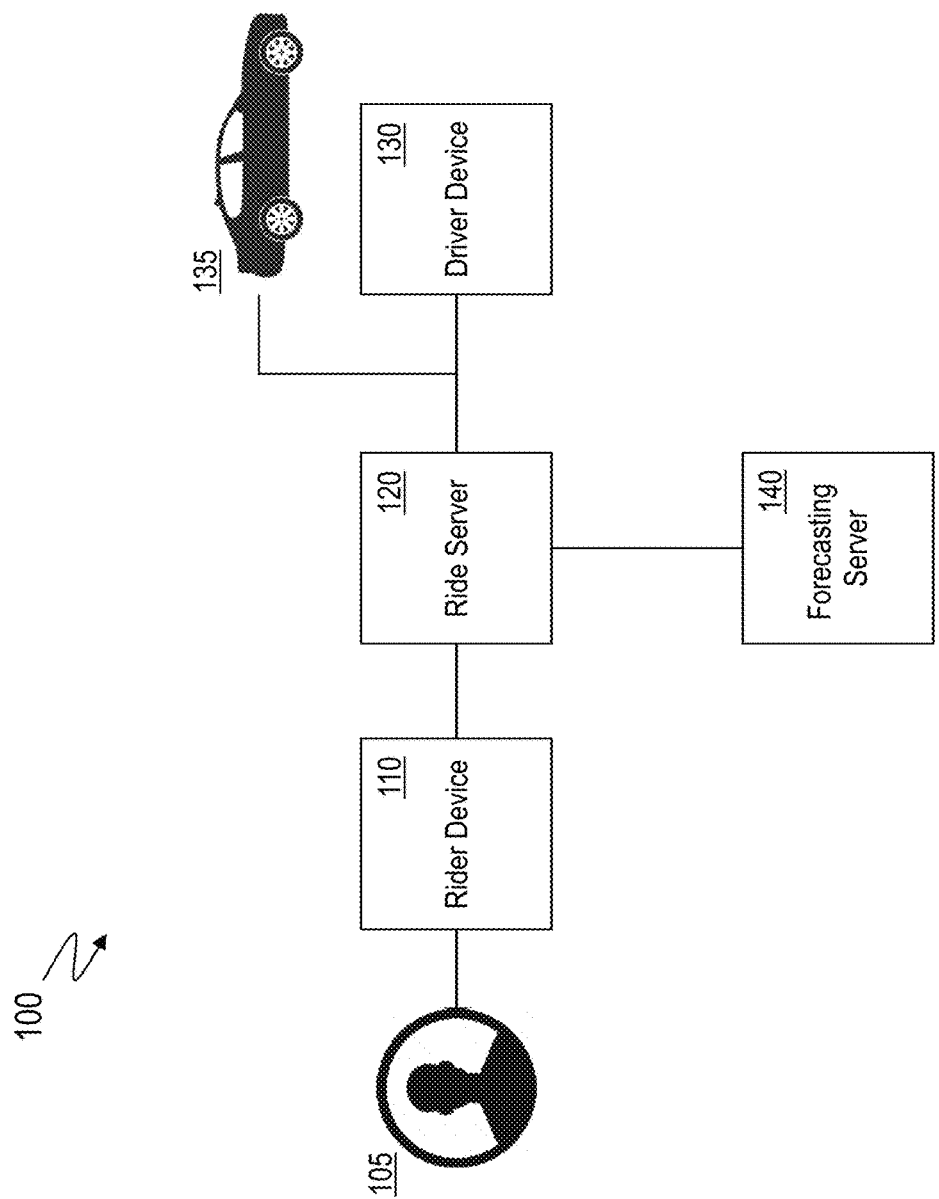
FIG. 1 illustrates a block diagram of an exemplary system for requesting rides, in accordance with one or more embodiments.

Described here are exemplary technical solutions for implementing and/or training neural network systems for predicting and responding to travel demand. Predicting travel demand includes predicting a number of requests for travel, such as for using cabs, buses, trains, or any other travel service, at specific times and at specific zones in a geographic region. Some embodiments described herein use a services, such as UBER™, DIDI™, and the like as an example for training a neural network, however, it should be noted that the technical features may be used in other transit services (such as mass transit) without undue experimentation by a person skilled in the art. Technical features described herein include a facilitated training of a neural network system, which can thus improve the operation of computing systems for predicting travel demand. As such, the technical solutions are rooted in and/or tied to practical applications of computer technology in order to overcome problems specifically arising in the realm of computers, i.e., training neural network systems for predicting travel demand.

Further, the technical solutions described herein facilitate transporting vehicles to a specific zone in a geographic region at a specific time, according to the inventive travel demand prediction, and thus minimize wait times of users requesting travel from the specific zone at the specific time. As discussed herein, a specific time may be a timeslot, such as a 10-minute timeslot, a 15-minute timeslot, a 30-minute timeslot, or any other timeslot of a predetermined duration. In one or more examples, scheduling vehicles includes scheduling autonomous vehicles to be available at the specific zones at the specific times. In some embodiments, the scheduling of vehicles includes sending requests to one or more vehicle drivers, with requests to drive to the specific zone at the specific time according to the prediction. In some embodiments, the scheduling of the vehicles may include determining a number of vehicles, which may be referred to as travel-supply, that are already available in the specific zone.

Thus, such a supply-demand forecasting facilitates predicting the volume of vehicles and riders at the specific time period in the specific zone of the geographic region. For example, demand may surge in a first zone, which is a residential area, in the mornings and in a second zone, which is a business district, in the evenings. The technical features described for forecasting the supply-demand for the vehicles and ride requests facilitate transit companies, such as ride-hailing companies to maximize utilization of drivers/vehicles and ensure that riders can get a vehicle with a predetermined minimum wait time. Such forecasting includes analysis of large amounts of data, that has to be performed by computers. For example, DIDI™, which is a ride-hailing company in China, processes over 11 million trips, plans over 9 billion routes, and collects over 50 TB of data per day (according to data available in 2016). Accordingly, for analyzing such amounts of data, the technical solutions described herein facilitate training neural network computing systems, or simply neural network systems.

In other words, the technical features described herein address the technical problem of generating a short-term travel demand prediction based on data from transportation network sensors, user devices (such as mobile phones, wearables, etc.) and transporting vehicles according to the predictions, such as by transporting autonomous vehicles.

FIG. 1 illustrates a block diagram of an exemplary system 100 for requesting rides, in accordance with one or more embodiments. As depicted, a rider 105 can request a ride by sending the request from rider device 110 to a ride server 120. The request can include, among other information, a place of origin and destination for the ride. In one or more examples, the rider device 110 may be a mobile phone, a wearable device, or any other communication device. The ride server 120, in response, schedules a ride for the rider 105, by relaying the request to a vehicle 135. The vehicle 135 may be an autonomous vehicle, which initiates movement towards the place of origin specified in the request from the rider device 110. Alternatively, or in addition, the ride server 120 can schedule the ride by relaying information about the request to a driver device 130, wherein the driver device 130 indicates to a driver of the vehicle 135 to transport towards the place of origin. The driver device 130 may be a mobile phone, a wearable device, or any other communication device. In one or more examples, the forecasting server 140 and the ride server 120 may be implemented as part of a single device. Alternatively, or in addition, the ride server 120 and the forecasting server 140 may be implemented as distributed computing systems.

Figure 2:
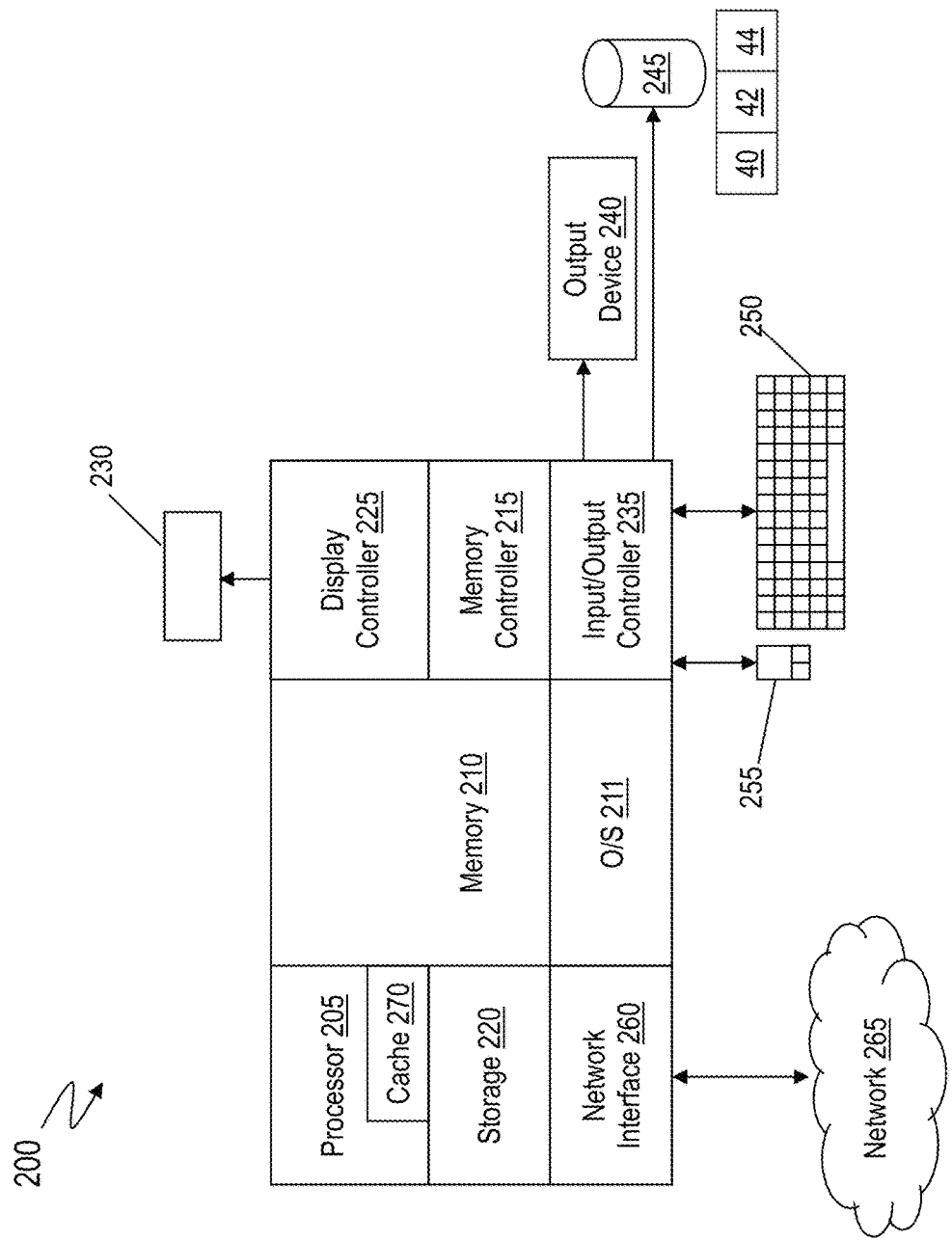
FIG. 2 illustrates an example computing apparatus, in accordance with one or more embodiments.

FIG. 2 illustrates an example apparatus 200 for implementing one or more technical solutions described herein. The apparatus 200 may be a communication apparatus, such as a computer. For example, the apparatus 200 may be a desktop computer, a tablet computer, a laptop computer, a phone, such as a smartphone, a server computer, or any other device that communicates via a network 265. The apparatus 200 includes hardware, such as electronic circuitry. In one or more examples, the neural networks described herein may be implemented using graphical processing units, or any other hardware that facilitates efficient parallelization of computing. Alternatively, or in addition, the neural networks may be implementing using one or more electronic circuits such as SYNAPSE™, QUARK™, or any other chips or a combination thereof The apparatus 200 includes, among other components, a processor 205, memory 210 coupled to a memory controller 215, and one or more input devices 245 and/or output devices 240, such as peripheral or control devices, that are communicatively coupled via a local I/O controller 235. These devices 240 and 245 may include, for example, battery sensors, position sensors (altimeter 40, accelerometer 42, GPS 44), indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the apparatus 200, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor 205 to execute one or more aspects of the systems and methods described herein.

The apparatus 200 may further include a display controller 225 coupled to a user interface or display 230. In some embodiments, the display 230 may be an LCD screen. In other embodiments, the display 230 may include a plurality of LED status lights. In some embodiments, the apparatus 200 may further include a network interface 260 for coupling to a network 265. The network 265 may be an IP-based network for communication between the apparatus 200 and an external server, client and the like via a broadband connection. In an embodiment, the network 265 may be a satellite network. The network 265 transmits and receives data between the apparatus 200 and external systems. In some embodiments, the network 265 may be a managed IP network administered by a service provider. The network 265 may be implemented in a wireless fashion, for example, using wireless protocols and technologies, such as WiFi, WiMax, satellite, or any other. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), intranet or other suitable network system and may include equipment for receiving and transmitting signals.

The apparatus 200 may be a block diagram for the ride server 120, the rider device 110, the driver device 130, and/or the forecasting server 140.

Depending on where the vehicle 135 starts from, the time required for the vehicle 135 to reach the place of origin to initiate the ride for the rider 105 can vary. Thus, in one or more cases, the rider 105 may have to wait longer than what is expected. Accordingly, a technical problem exists to forecast the request for the ride from the place of origin at a specific time, which may be facilitated by having the vehicle 135 closer to the place of origin, and thus reduce the wait time. Embodiments of a forecasting server 140 in accordance with the present invention uses technical features (described in more detail below) addresses such technical problems.

Typically, forecasting transit demand has been performed as a long-term prediction, with low accuracy, and coarser granularity, such as in the context of city planning. In contrast, embodiments of the present invention include technical features that facilitate short-term travel demand prediction, with higher accuracy and specificity (with respect to both, time and location). For example, long-term prediction typically involved a four-step process (on a macro-simulation scale) for trip generation (the number of trips to be made). Such long-term predictions may be based on land use characteristics (i.e. how land is used in a geographic region, residential or business) to determine trip generation rates. This is because factors like a number and size of households, automobile ownership, types of activities (residential, commercial industrial, etc.), and density of development all can generally contribute to how much travel flows from or to a specific zone within the region. Such long-term predictions may also estimate trip distribution (where the rides go), and a travel mode choice for the trips (how the trips will be divided among the available modes of travel) and concluded with a trip assignment (predicting the route trips will take). Long-term prediction models like these, may use such analysis to assign zones within the geographical region for specific types of activities, in an attempt to manage traffic patterns. In contrast, some embodiments of the present invention include technical features that can determine and use existing traffic patterns to predict requests for rides from a zone within the geographic region, at a specific time slot, and further direct the transport one or more vehicles to the zone to meet requests for rides during a specific time slot.

Some embodiments of the present invention include technical features that facilitate implementing a hybrid deep learning architecture for travel demand prediction using neural network systems. For example, the forecasting server 140 can facilitate determining a measure/extent of the impact of one or more factors on travel demand, and based on the measure classify historic data regarding travel demand into categories, such as main factors, low dimensional auxiliary factors, and high dimensional auxiliary factors.

Alternatively, forecasting server 140 may generate a prediction based on a micro-simulation of daily activity, and travel patterns of one or more individuals. For example, techniques such as factorization machine, multi-output support vector regression machines may be used to model the micro-simulation data. In such cases, detailed information for such individuals in a zone is obtained. Examples of such information include (without limitation): age, gender, income, home location, work location, travel routine (usual times), etc. and based on a model of an individual, a prediction is generated whether the user may request a ride. The literature indicates that such a (micro-simulation based) model is theoretically ideal, but not practical, as obtaining the required information for each individual can be difficult.

In some embodiments, the forecasting server 140 can use one or more neural network systems for the prediction based on classified data. The use of neural networks for generating such predictions can be confronted by technical problems, such as a combinatorial explosion. For example, travel demand and supply can be affected by several factors other than location and timeslot, such as working day or holiday, day of week, traffic conditions, weather conditions (rain/snow/sunny), temperature, particulate matter (PM) pollution measurements e.g., PM 2.5, events (concert/football game), land usage (points of interest [POI]), etc. One or more of the factors may be correlated, for example, residential POI generates travel demand in working day morning (even higher with heavy PM 2.5), and dining & entertainment POI attract travel demand in the evening. Such correlations may lead to a combinatorial explosion.

Figure 3:
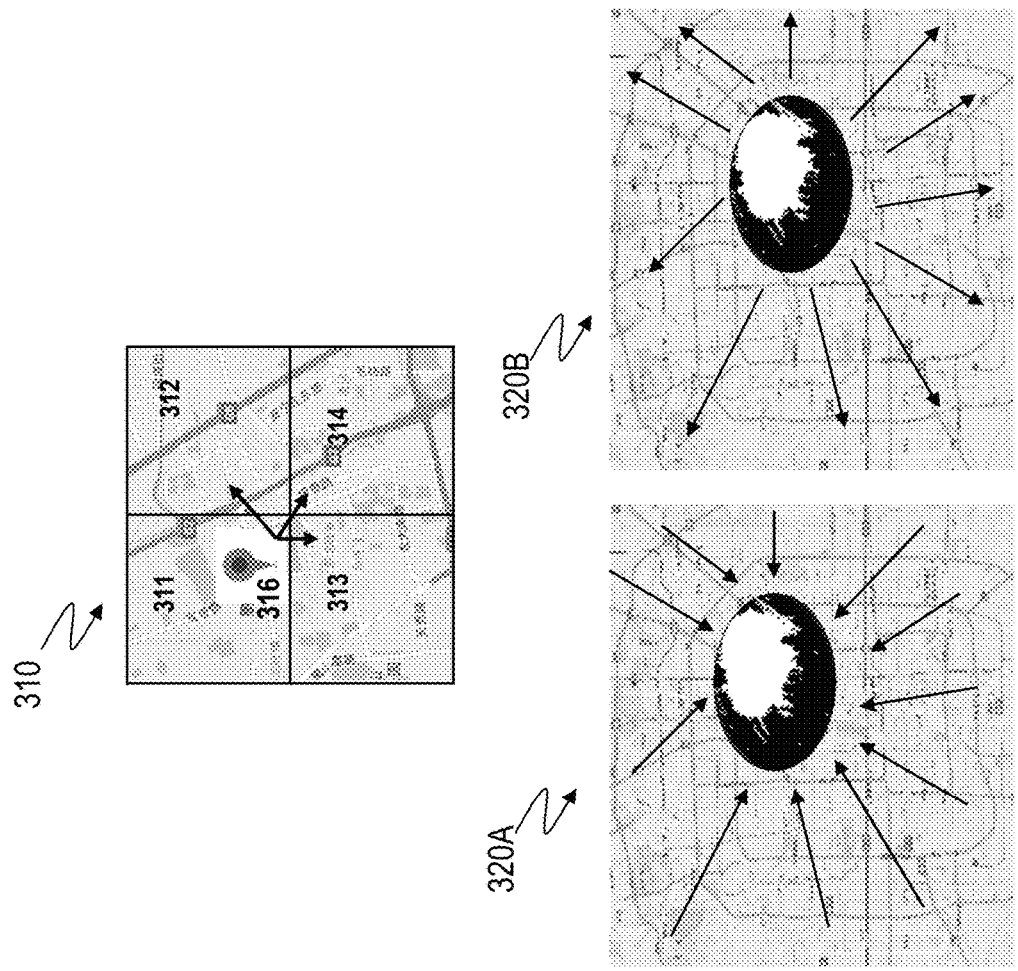
FIG. 3 illustrates example scenarios for predicting travel demand, in accordance with one or more embodiments.

Further, adjacent areas and time slots having a correlation with each other can also present a technical problem, such as a combinatorial problem. FIG. 3 illustrates example scenarios affected by such problems. For example, with reference to the zones shown in block 310, a zone-1 311 that includes a workplace 316, such as a software development laboratory, generates travel demand in adjacent zones, zone-2 312, zone-3 313, and/or zone-4 314, in the evening, because people from the workplace in zone-1 311 may walk for dinner to the adjacent zones 312-314 and then request rides from the adjacent zones 312-314.

Another technical problem for generating the prediction includes timeslot correlation, which can lead to a combinatorial problem. In one or more examples, such temporal correlation may include adjacent timeslot correlation. For example, if people usually leave home around 7:00 AM, and assuming 10 minute timeslots, travel demand of the time slots of 6:50 AM, 7:00 AM, and 7:10 AM can be correlated, because people may not leave precisely in the same timeslot every day, rather one of the adjacent ones. Additionally, the temporal correlation may include delayed timeslot correlation. Referring again to FIG. 3, for example, block 320 illustrates exemplary effects of an event, such as a concert, game, or any other such event, that spans multiple timeslots, on travel demand. For example, if the timeslot is a 10-minute timeslot, block 320A illustrates a first surge in requests for rides towards the location of a concert at the time the concert is scheduled to begin (e.g.: 19:00), and block 320B illustrates a second surge in requests for rides away from the location of the concert at the scheduled end time (e.g.: 23:00). In this scenario, the second surge depends on the first surge, for example, the number of requests in the second surge may be related to the number of requests in the first surge.

Some embodiments of the present invention include technical features that can address such technical problems to facilitate training the neural network(s) for generating the prediction. In one or more examples, the forecasting server 140 (FIG. 1) can build data structures for training the neural networks.

As will be discussed in more detail below. Such data structures can include one or more travel-analysis zone (TAZ) timeslot cubes, TAZ-factor cubes, and/or other data structures. In some embodiments, the TAZ-timeslot cubes and the TAZ-factor cubes can represent a spatial-temporal relationship, which can be identified from the historic data during the training, and used for generating the travel demand prediction. In one or more examples discussed below with reference to FIG. 6, the TAZ-timeslot cubes and the TAZ-factor cubes can be built based on several factors, such as main factors, reduced low dimensional auxiliary factors, and compressed high dimensional auxiliary factors.

As described herein, using the TAZ cubes for training the neural networks addresses the spatial and temporal correlations described earlier. For example, a convolution neural network is trained using TAZ-timeslot or TAZ-factor cubes to learn spatial neighborhood correlations. In one or more examples, the convolution neural network may use 3D convolution and multiple TAZ-timeslot cubes. Additionally, or alternatively, in one or more examples, a recurrent neural network is trained using the TAZ cubes to learn the adjacent and delayed temporal dependencies between the timeslots. For example, multiple TAZ-factor cubes may be used for a convolution neural network, followed by the recurrent neural network to generate the predictions.

Further yet, there are several (hundreds or more) auxiliary factors that affect the travel demand. For example, consider the land usage factor; there may be millions of points-of-interest (POI) that fall into hundreds of categories for a geographic region, such as a city. Thus, an input vector of land usage factor is a high-dimensional vector, with hundreds of dimensions, each dimension corresponding to a POI-type, and each dimension storing a number of POIs in that type. Such an input vector would overwhelm training using main factors if used directly. For a more quantitative example, consider the POI data of a city, typically includes total types of POIs=176, with type-level1=25 type-level2=18. Further, in a typical database that provides POI data, for a typical zone, the number of POI on average is 2,971 with a maximum number of POs for a zone being 461,563 with a standard deviation of 13,743.92.

Such high-dimensional vectors of auxiliary factors adversely affect the training by overcoming the effects of the main factors, which are relatively lower in number compared to the auxiliary factors. Typically, clustering methods like k-means are used to reduce high-dimensional data, but the accuracy loss may be unknown based on input parameters. Also, principal component analysis (PCA) may be used to reduce high-dimensional data and is aware of the accuracy loss. However, PCA uses additional time and resources for processing. Accordingly, the technical features described herein address the technical problem of high-dimensionality of auxiliary factors by using an auto-encoder that reduces the high-dimensionality according to a regression operation performed while training the recursive neural network. For example, by using the regression, the auto-encoder abandons irrelevant auxiliary factors and reduces the dimensionality of the auxiliary factors that are used for training the neural networks.

Accordingly, the forecasting server 140, by using the technical features described herein implements a hybrid deep learning architecture that reduces the high-dimensionality of factors used for training one or more neural networks, according to a regression task, and further reduces compression loss at the same time. Thus, the forecasting server 140 addresses the technical problems faced when implementing and training one or more neural networks for predicting a travel demand for one or more zones in a geographical region and at a specific timeslot. The forecasting server 140 may perform supervised and/or unsupervised learning, and in one or more examples, both types of learning may be performed at the same time.

The forecasting server 140 may implement one or more neural networks (examples of which will be discussed in more detail below). Accordingly, the forecasting server 140 may use a deep learning architecture to abstract large number of combination features directly from raw data of travel demand, and avoid any human intervention. For example, the forecasting server 140 may use deep learning architectures such as deep neural networks, convolutional deep neural networks, deep belief networks, recurrent neural networks, and/or a combination thereof for predicting the travel demand.

Figure 4:
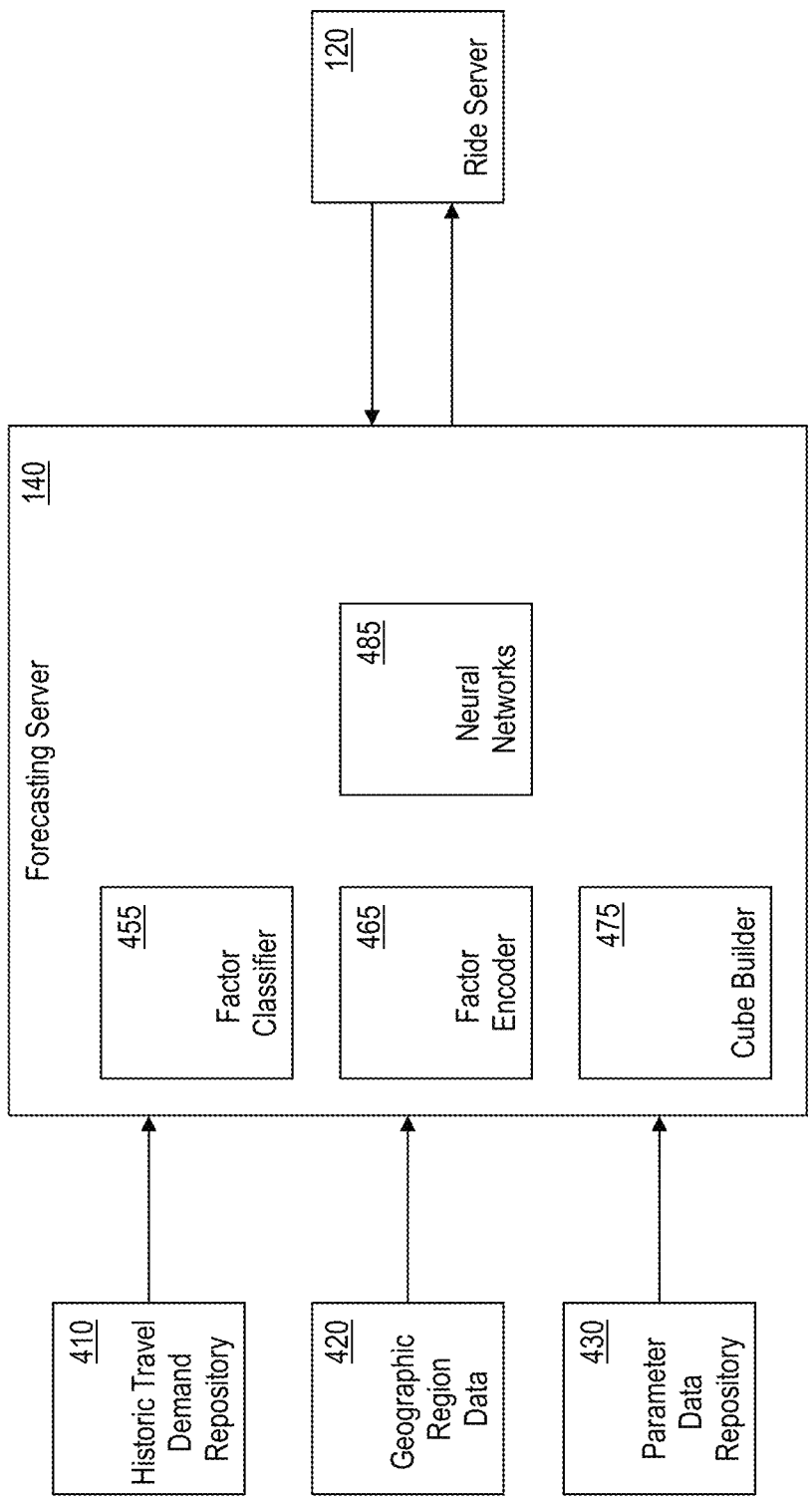
FIG. 4 illustrates an exemplary forecasting server with one or more data repositories, in accordance with one or more embodiments.

FIG. 4 illustrates an exemplary forecasting server with one or more data repositories, in accordance with one or more embodiments. The forecasting server 140 using one or more data repositories for training neural networks 485, and further generating a travel demand prediction in response to receiving a prediction request from the ride server 120. The forecasting server 140 accesses data from one or more data repositories. In one or more examples, the data repositories include a travel demand data repository 410, a geographic region data repository 420, and a parameter data repository 430.

The travel demand data repository 410 stores historic data of travel demand data. For example, the travel demand data repository 410 includes data regarding prior requests for rides, such as timeslots the requests were made, zones from which the requests were made, places of origin for the requests, and places of destination for the requests, and other such data.

The geographic region data 420 stores data regarding the geographic region in which the ride server provides ride-hailing services. For example, the geographic data repository 420 includes maps, distances, travel routes, and other such information for the geographic region. Further, in one or more examples, the geographic region data repository 420 includes division of the geographic region into zones. For example, the geographic region data repository divides the geographic region, such as a city, county, state, country etc. into n non-overlapping zones, or districts D={d1,d2 , . . . , dn}.

The parameter data repository 430 stores values of one or more parameters (or factors) that affect travel demand over a duration of time. In one or more examples, the parameter data repository 430 includes the values for the parameters for at least the timeslots for which the travel demand data repository 410 includes travel demand data. For example, the parameter data repository 430 includes values for factors such as traffic conditions, weather conditions (rain/snow/sunny), temperature, PM 2.5, events (concert/football game), and the like for each timeslot being used for training the neural networks 485. In addition, the parameter data repository 430 may provide access to real-time feeds to facilitate the forecasting server 140 to access real-time values of the factors that are used for generating the travel demand prediction. For example, the real-time feeds include weather information, traffic information, and the like.

In one or more examples, additional data repositories may store and provide the forecasting server 140 access to additional data that is not shown and that may be used for training the neural networks 485. The forecasting server 140 accesses the data from the data repositories for training the neural networks 485. The forecasting server 140 includes one or more modules for training the neural networks 485. For example, the forecasting server 140 includes a factor classifier 455, a factor encoder 465, and a cube builder 475, that facilitate training the neural networks 485. In one or more examples, the forecasting server 140 communicates with the ride server 120 to provide a prediction to the ride server 120, to further facilitate transporting a vehicle for meeting one or more ride requests according to the prediction.

In one or more examples, the neural networks 485 includes a 3D convolutional neural network (CNN). The forecasting server 140 uses the 3D CNN for determining spatial neighborhood correlations. The forecasting server trains the 3D CNN using TAZ cubes as input data. The cube builder 475 builds or generates the TAZ cubes based on the accessed data from the data repositories 410-430.

Figure 5:
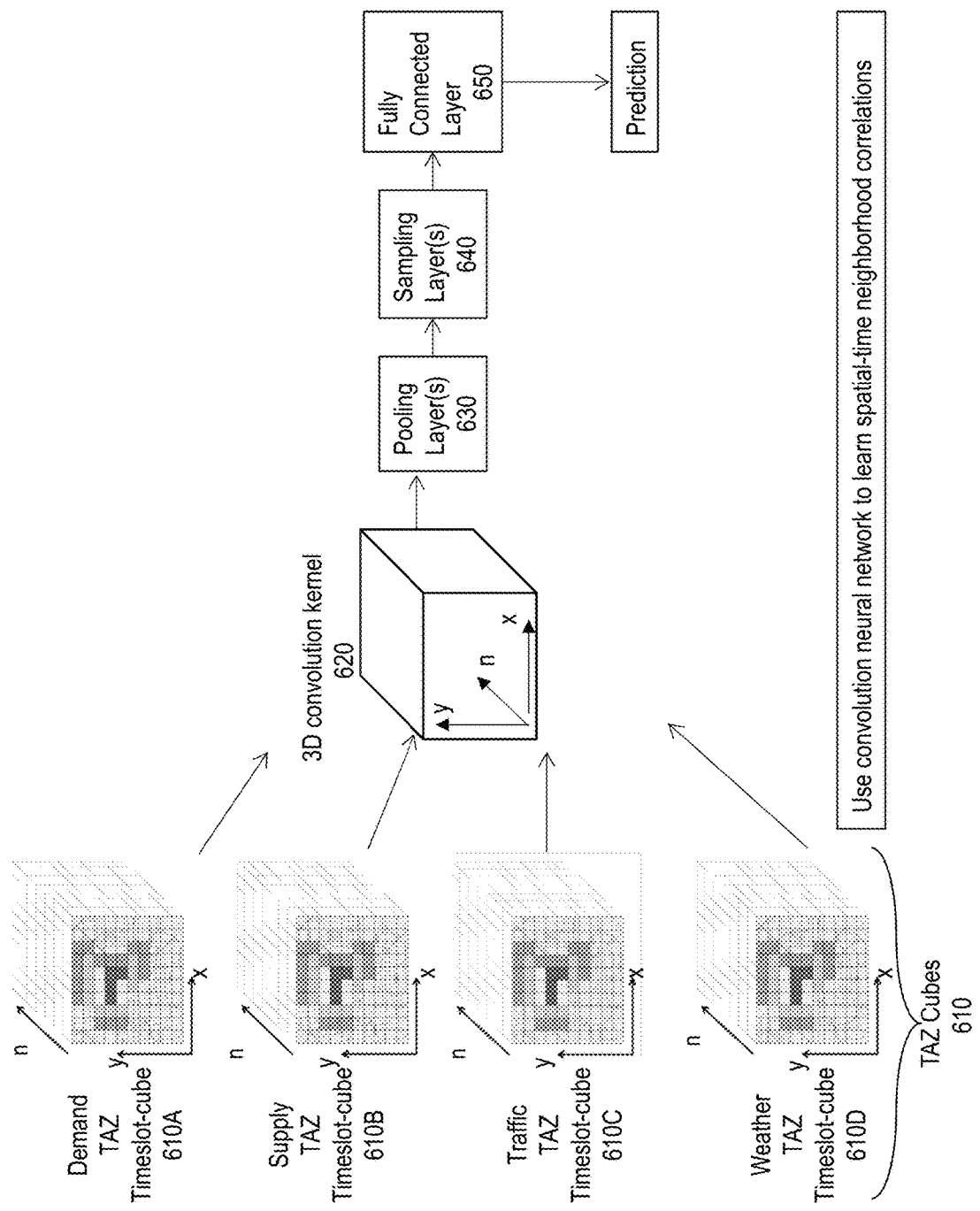
FIG. 5 illustrates an example training of a multi-dimension convolutional neural network (CNN), in accordance with one or more embodiments.

FIG. 5 illustrates an example training of a multi-dimension convolutional neural network (CNN), in accordance with one or more embodiments. In one or more examples, the TAZ cubes 610 are TAZ timeslot-cubes, one cube for each respective parameter from the parameters data repository 430. For example, FIG. 5 illustrates a demand timeslot-cube 610A, a supply timeslot-cube 610B, a traffic timeslot-cube 610C, and a weather timeslot-cube 610D. It should be noted that different, fewer, and/or more timeslot-cubes may be used by other implementations for training the 3D CNN.

In one or more examples, the cube builder 475 generates the TAZ timeslot-cubes 610, with each timeslot-cube of the same dimensions. For example, the dimensions of each of the TAZ timeslot-cubes 610 are based on the number zones the geographical region is divided and length of the timeslot. For example, if the geographical region is divided into x*y zones, and if there are n timeslots, the dimensions of each of the TAZ timeslot-cubes 610 are (x, y, n). In other words, the traffic TAZ timeslot-cube 610 C includes n matrices of dimensions x*y, each matrix corresponding to a respective timeslot, and where a matrix includes values of the traffic parameter at each zone during a corresponding time slot. In a similar manner, each of the TAZ timeslot-cubes includes n matrices with corresponding parameter values at respective timeslots. The forecasting server 140 uses the TAZ timeslot-cubes for training the 3D CNN. By training the 3D CNN, the forecasting server 140 computes a 3D convolution kernel 620 of the same dimensions as each of the TAZ timeslot-cubes 610. The 3D convolution kernel 620 includes bias factors that are computed based on training the 3D CNN using historic data. The forecasting server 140 uses back-propagation during the training of the 3D CNN to determine the bias factors (or weights, or filter values) in the 3D convolution kernel 620. Typically, the 3D convolution kernel 620 includes random bias factors initially, which are fine-tuned during the training phase. The 3D CNN fine-tunes the bias factors in the convolution kernel using one or more pooling layers 630 such as max-pooling, sampling layers 640, and/or sub-sampling layers (not shown). The 3D convolution network may further include a fully-connected layer 650 that outputs the predicted value of the vehicle demand based on input the TAZ timeslot-cubes 610.

Figure 6:
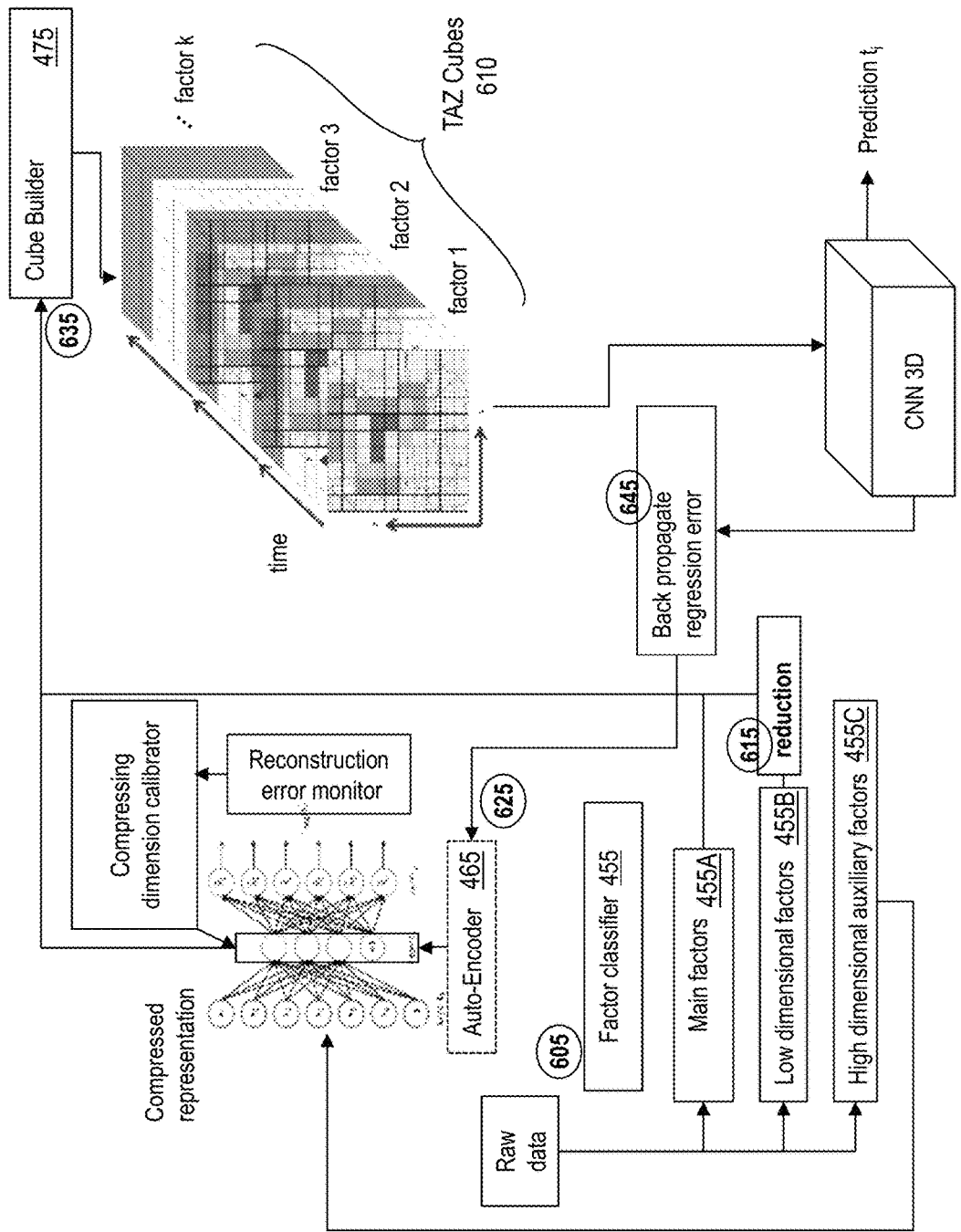
FIG. 6 illustrates an exemplary flow diagram, in accordance with one or more embodiments.

FIG. 6 illustrates an exemplary flow diagram for generating a prediction using a multi-dimension CNN based on TAZ timeslot-cubes, in accordance with one or more embodiments. At 605, the factor classifier 455 accesses raw data from the data repositories 410-430 and categorizes the parameters to be used for training a neural network, such as 3D CNN. In one or more examples, the factor classifier 455 classifies the parameters into 3 categories: main factors 455A, low dimensional auxiliary factors 455B, and high dimensional auxiliary factors 455C. The main factors may include time and location. A parameter is categorized as a low dimensional or high-dimensional factor based on a number of dimensions associated with that factor. For example, because there may be thousands of points of interests in the geographic region, points of interest may be a high-dimensional factor; whereas, a pollution level may be a low dimensional factor.

Further, at 615 the number of factors identified as low dimensional factors are reduced. In one or more examples, an administrator or another user may identify the factors to be used, thereby reducing the number of low dimensional factors used during training. Alternatively, the number of low dimensional factors are reduced using machine learning. For example, deep learning architecture is used to abstract the combination features directly from raw data, and avoid handicraft features.

Figure 7:
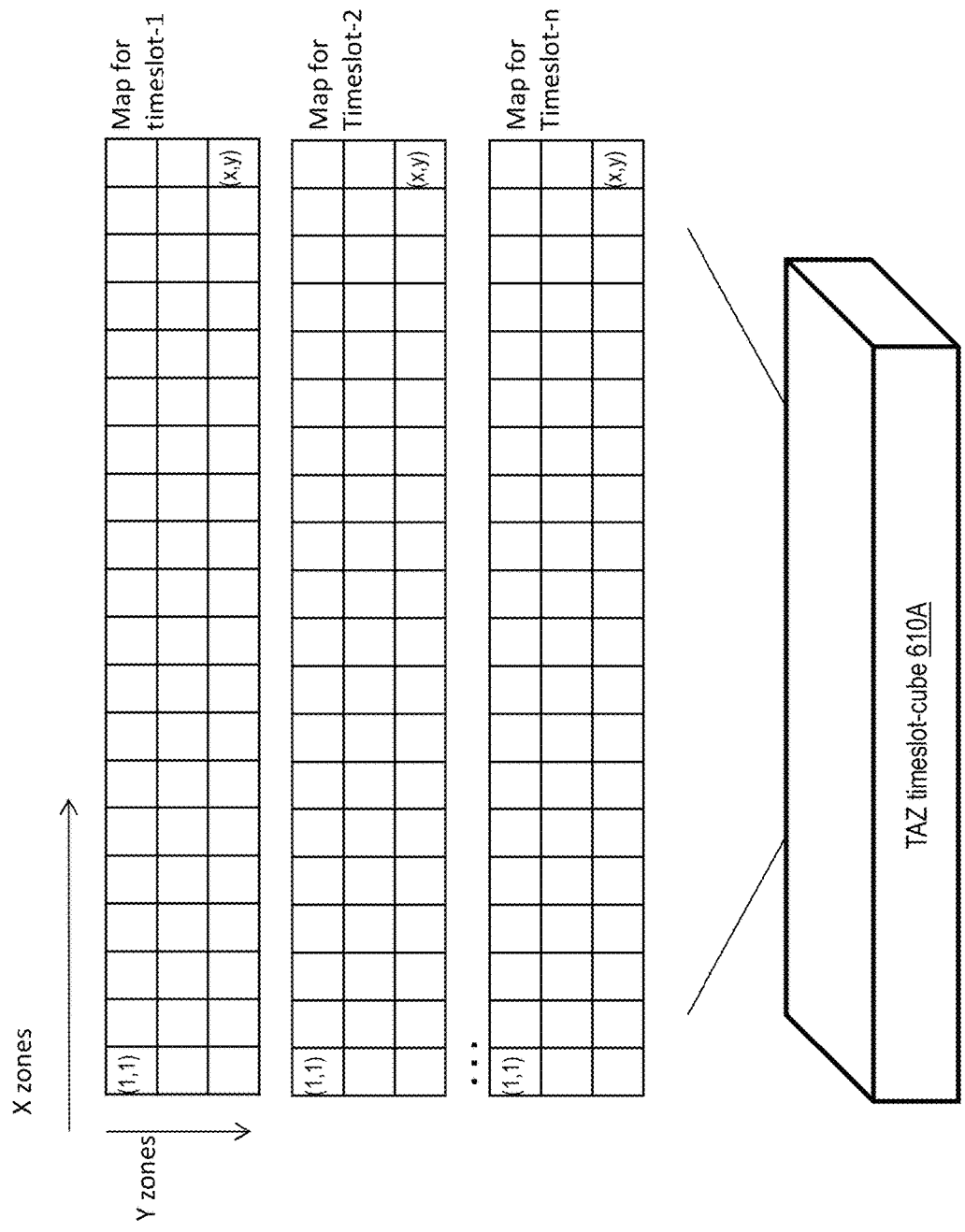
FIG. 7 illustrates exemplary data structures used by the example factor classifier depicted in FIG. 4, in accordance with one or more embodiments.

FIG. 7 illustrates exemplary data structures used by the example factor classifier depicted in FIG. 4, in accordance with one or more embodiments. For example, the factor classifier 455 uses the data structures to perform deep learning to determine the combination of parameters to use for predicting the travel demand. For example, table 1 illustrates a feature vector that depicts a list of parameters that is to be reduced, such as a list of the low dimensional factors.

TABLE 1

| 1 | gap |
| 2 | demand |
| 3 | supply |
| 4 | traffic1 |
| 5 | traffic2 |
| 6 | traffic3 |
| 7 | traffic4 |
| 8 | weather |
| 9 | tempreture |
| 10 | PM25 |
| 11 | weekday |
| 12 | timeIndex |
| ... | ... |

Here 'gap' represents a number of people 105 who did not get a ride within a predetermined time, 'demand' represents a total number of ride requests, 'supply' represents a total number of vehicles 135 available to provide ride service, "traffic1-4" represent a variety of traffic states, and the remaining parameters are self-explanatory. For example, traffic-1 represents no congestion, whereas traffic-4 represents high congestion, with traffic-2 and 3, representing traffic states between these extreme conditions.

For example, the deep learning for reducing the number of factors uses tensors during the deep learning. As illustrated, the deep learning may use n tensors (or matrices), each matrix being a feature map corresponding to a time slot. Each matrix includes x*y parameter values during the corresponding time slot at a specific zone in the geographic region, where the geographic region is divided into x*y zones. Thus, a coordinate (i, j) within a matrix provides the parameter value for the zone given by coordinates (i, j). For example, an X tensor has dimensions n*x*y, while a Y tensor has dimensions 1*1* x, in this case. Further, a 3D coordinate (i, j, t), provides a parameter value at the zone (i, j) at time slot t. Accordingly, the factor classifier 455 reduces the number of parameters to be used for training the neural networks 485 using deep learning or machine learning to identify the parameters to be used for the training.

Further, the high dimensional factors are compressed by the factor classifier 455, at 625. For example, the factor classifier 455 uses an auto-encoder neural network 465, which is an unsupervised learning algorithm that applies backpropagation, for setting the target values to be equal to the inputs. The auto-encoder 465 may be a feedforward, non-recurrent neural network having an input layer, an output layer and one or more hidden layers connecting them. For the auto-encoder, the output layer has the same number of nodes as the input layer. The auto-encoder reconstructs its own inputs (instead of predicting the target value Y given inputs X). the auto-encoder 465 may be a denoising encoder, a sparse encoder, a variational encoder, a contractive encoder, or any other type of auto-encoder. Further, as illustrated the auto-encoder uses regression error from back-propagation (645) of the 3D CNN for the compression of the high-dimensional parameters, by identifying, and abandoning irrelevant components according to the regression errors.

The cube builder 475, using the parameters identified by the auto-encoder (S3), and the deep machine learning (S2), generates the TAZ timeslot-cubes 610, at 635. The TAZ timeslot-cubes 610 are used to train the 3D CNN, that is, to automatically and dynamically generate one or more 3D convolutional kernels 620 that include the bias factors to be used for predicting the demand. As described earlier, the backpropagation error during the training is used for the auto-encoder, at S3.

The 3D CNN thus trained is then used to generate the prediction by inputting a set of parameter values. Inputting the parameter values may include the forecasting server 140 accessing the parameter values from the data repositories 410-430. Based on the 3D convolutional kernel(s) that were generated during the training, the 3D CNN generates a prediction for the demand. For example, the output prediction of the 3D CNN may be a matrix that predicts the demand in each zone of the geographic region for an input timeslot, based on the parameter values. Further, the prediction includes the gap that represents a number of riders 105 that did not receive a ride within a predetermined time after making or sending a ride request.

Figure 8:
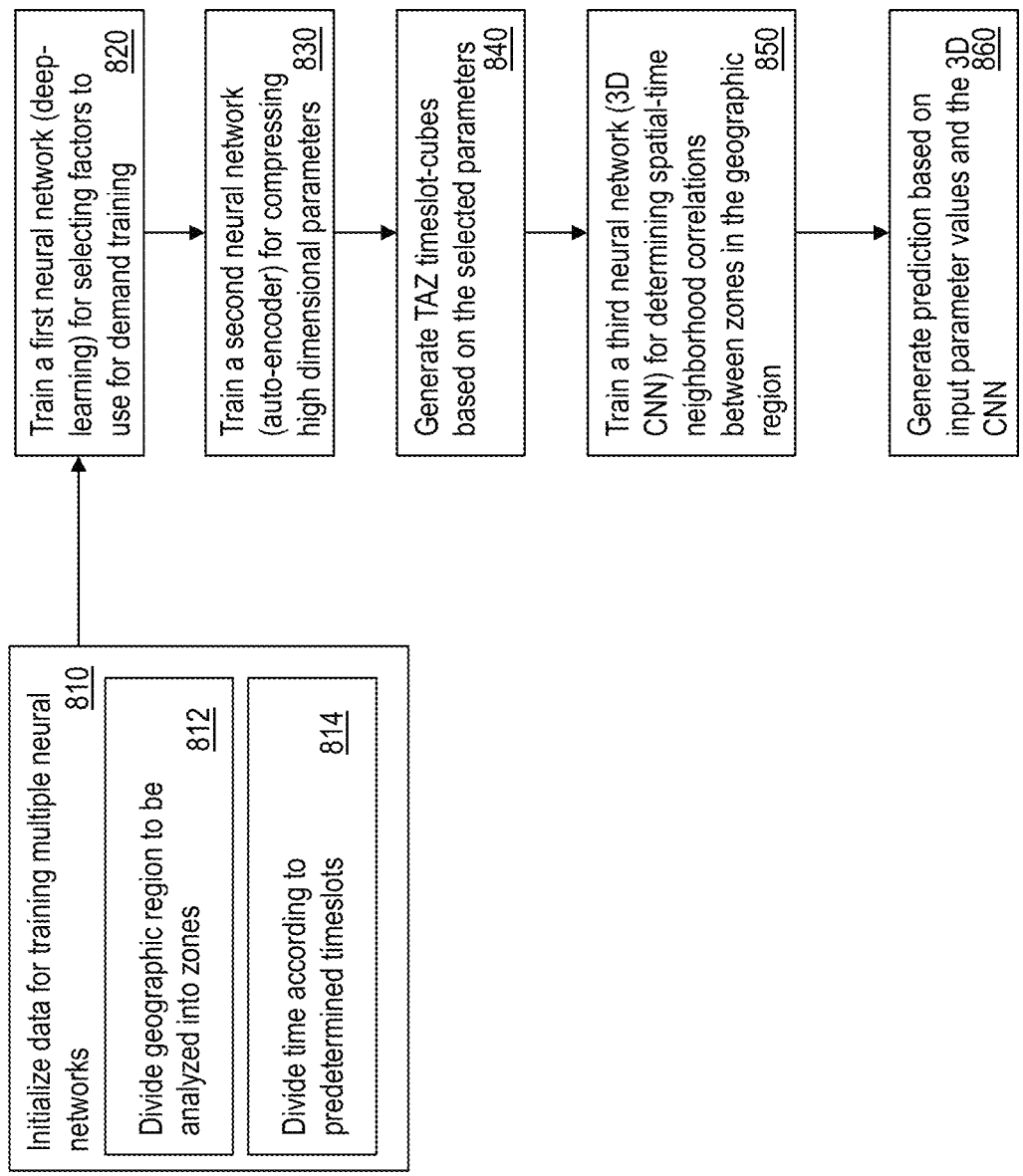
FIG. 8 illustrates a flowchart of an example method, in accordance with one or more embodiments.

FIG. 8 illustrates a flowchart of an example method, in accordance with one or more embodiments. For example, the method is for generating a prediction of the demand for the ride requests using the multiple neural networks 485 described so far. In one or more examples, the forecasting server 140 implements the method. The method includes initializing data for training the multiple neural networks 485, as shown at 810. Initializing the data includes dividing the geographic region that is to be analyzed into a predetermined number of zones, as shown at 812. In one or more examples, the division may be done manually, via a user interface. Alternatively, the forecasting server 140, divides the geographic region according to a predetermined grid. Further, initializing the data includes dividing time according to predetermined timeslots, such as 10 minute, 20 minute, 30 minute, or any other slot of predetermined duration, as shown at 814.

The method further includes training a first neural network for selecting, from the data repositories 410-430, parameters to use for demand training (training the 3D CNN), as shown at 820. The first neural network, as described above, may use an architecture for deep learning, such as a typical perceptron model, with an input layer, an output layer, and one or more hidden layers.

Further, the method includes compressing one or more high-dimensional parameters, from those selected. The compressing of the high-dimensional parameters includes training and using a second neural network, such as an auto-encoder, as shown at 830. The auto-encoder may include using backpropagation errors that are generated during the demand training.

Further, the method includes generating the TAZ timeslot-cubes 610 based on the selected parameters, as shown at 840. The dimensions of the TAZ timeslot-cubes 610 depend on the number of zones, number of timeslots (in a day, or any other predetermined observation period), and a number of selected parameters. For example, the cube builder 475 generates as many TAZ timeslot-cubes as the number of selected parameters, each cube including as many matrices as a number of timeslots, each matrix representing the zones of the geographic region.

Further, the method includes training a third neural network, the 3D CNN, such as for determining spatial-time neighborhood correlations between the zones in the geographic region, as shown at 850. Once the 3D CNN has been trained, the method includes generating prediction(s) based on input parameter values, as shown at 860.

Thus, the above example implementation trains and uses the 3D CNN for generating the prediction for the ride request demand based on spatial-time neighborhood correlations that the 3D CNN models automatically by computing the bias factors in the 3D convolution kernel using the TAZ timeslot-cubes 610.

Figure 9:
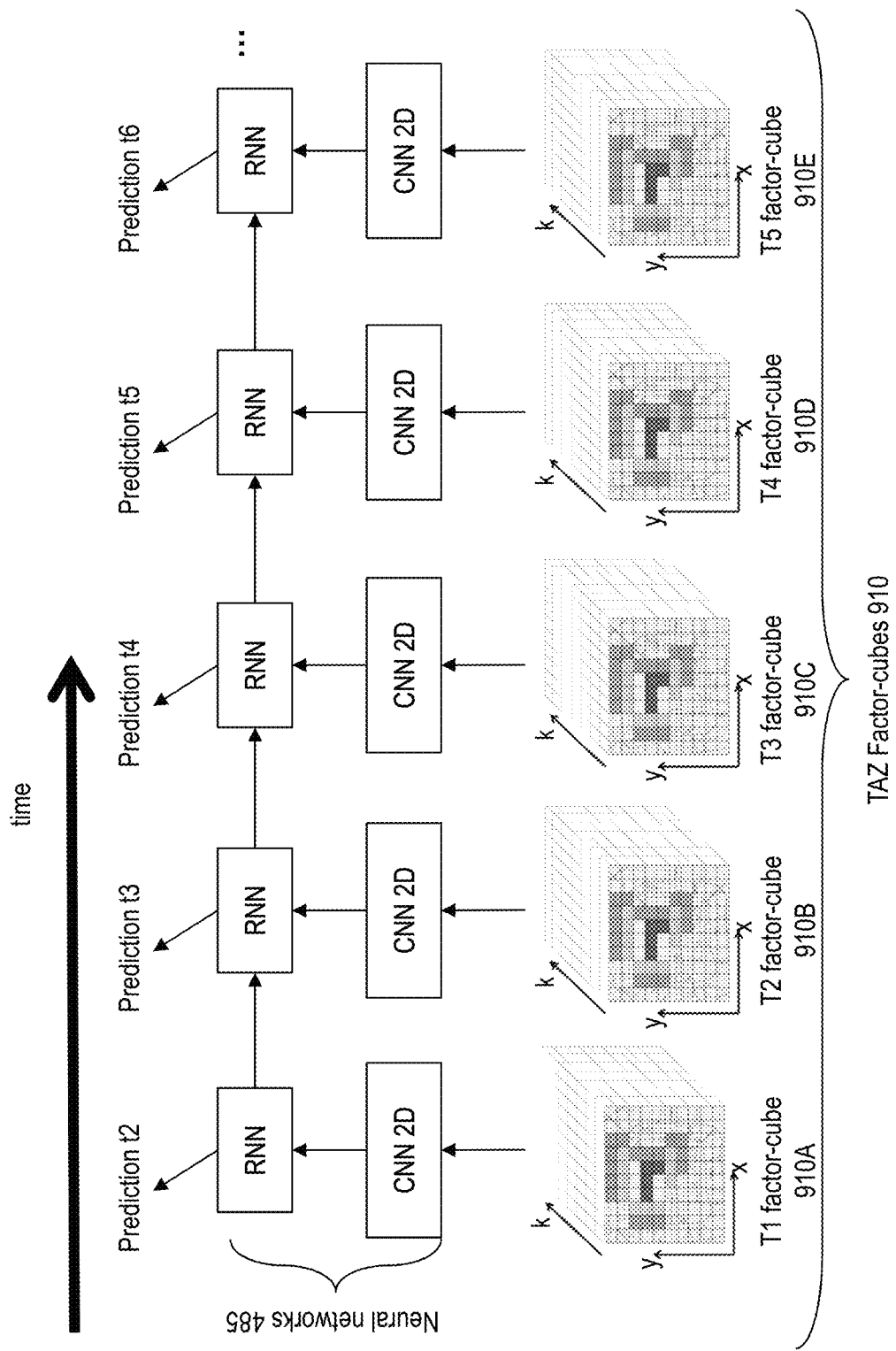
FIG. 9 illustrates another example of training of neural networks, in accordance with one or more embodiments.

In an alternative implementation, the neural networks 485 of the forecasting server 140 include a recurrent neural network (RNN) and a 2D CNN, which are trained and subsequently used to generate a prediction of the vehicle based on long and short-term dependencies of timeslots. FIG. 9 illustrates the combination of the RNN and 2D CNN being trained and used for generating the prediction using TAZ factor-cubes 910 (as opposed to TAZ timeslot-cubes 610).

The TAZ factor-cubes 910 include one cube for each respective timeslot that the forecasting server 140 uses. For example, FIG. 9 illustrates factor cubes 910A-910E for timeslots t1-t5 respectively. It should be noted that different, fewer, and/or more timeslot-cubes may be used by other implementations for training the neural networks 485.

In one or more examples, the cube builder 475 generates the TAZ factor-cubes 910, with each factor-cube of the same dimensions. For example, the dimensions of each of the TAZ factor-cubes 910 are based on the number zones the geographical region is divided and the number of parameters that are selected for training the neural networks 485. For example, if the geographical region is divided into x*y zones, and if there are k parameters, the dimensions of each of the TAZ factor-cubes 910 are (x, y, k). In other words, the traffic TAZ factor-cube 910A includes k matrices of dimensions x*y, each matrix corresponding to a respective parameter, and where a matrix includes values of the traffic parameter at each zone during the timeslot t1 of the cube 910A. The other TAZ factor-cubes 910 are generated in a similar manner.

Each cube is used for training the 2D CNN and the RNN. The RNN is an artificial neural network where connections between units form a directed cycle. The RNN also includes input layer, hidden layers, and output layers, however, unlike feedforward neural networks, the RNN can use an internal memory to process arbitrary sequences of inputs. The RNN may use any of the architectures such as fully recurrent, recursive, Hopfield, Elman, Jordan, long short-term memory (LSTM), or any other or a combination thereof. In the RNN one or more of the hidden layers is connected to itself In one or more examples, the RNN is trained to determine long short-term dependencies of timeslots. For example, each layer of the RNN uses a 2D CNN that identifies, from each of the TAZ factor-cubes 910, the parameters to train that layer of the RNN. In one or more examples, each layer of the RNN corresponds to each of the respective timeslots. Accordingly, each layer of the RNN is trained using each of the respective TAZ factor-cubes 910.

For example, for the timeslot t1, a first 2D CNN selects a first subset of parameters based on the TAZ factor-cube 910A. The first subset of parameters are used for training a first layer of the RNN. The first layer of the RNN generates a prediction-t2 for the timeslot t2. For the timeslot t2, a second 2D CNN selects a second subset of parameters, independent of the first subset of parameters. The second subset of parameters trains a second layer of the RNN. As described before, the hidden layers of the RNN are interconnected, such that the second layer of the RNN can use weights from the first layer. Each subsequent layer of the RNN is trained in a similar manner, for each timeslot $t_i$. Based on the training, the forecasting server 140 fine-tunes bias factors for each layer of the RNN.

Figure 10:
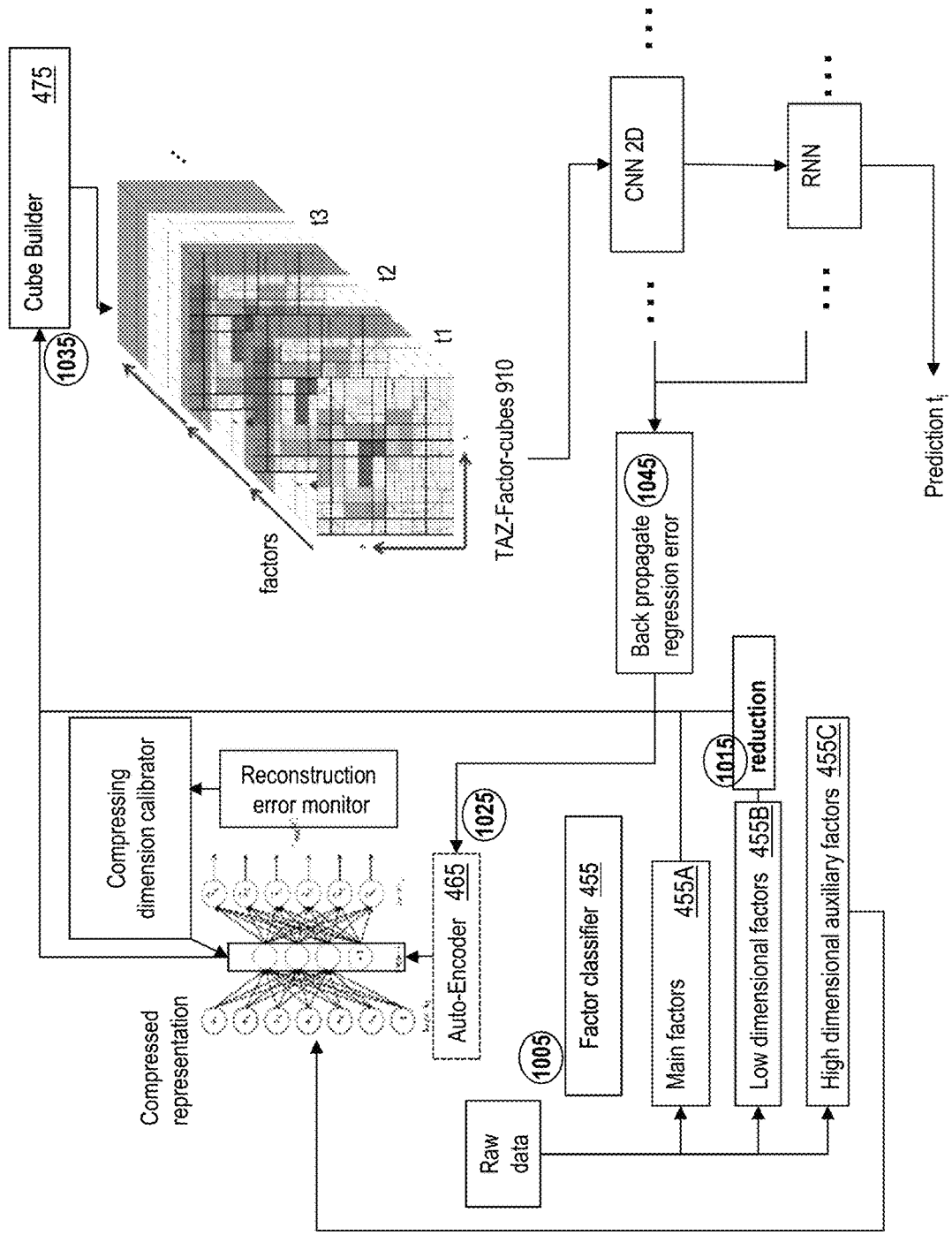
FIG. 10 illustrates a flow diagram for travel demand prediction using the neural networks depicted in FIG. 9, in accordance with one or more embodiments.

FIG. 10 illustrates a flow diagram for travel demand prediction using the neural networks depicted in FIG. 9, in accordance with one or more embodiments. For example, the method may use the combination of the 2D CNN and the RNN based on the TAZ factor-cubes 910. 1005, 1015, and 1025 are similar to 605-625 described earlier (FIG. 6). Accordingly, at 1005, the factor classifier 455 accesses raw data from the data repositories 410-430 and categorizes the parameters to be used for training the neural networks 485. Further, at 1015 the number of factors are reduced using deep learning, such as based on the tensors described earlier and illustrated in FIG. 7. Further, at 1025 the forecasting server 140 compresses high dimensional factors using another neural network, such as an auto-encoder, as described herein. The auto-encoder 465, in this case, uses the back-propagation errors from the 2D CNN and the RNN being trained to compress the high-dimensional parameters.

The cube builder 475, using the parameters identified by the auto-encoder 465, and the deep machine learning (1015), in this case, generates the TAZ factor-cubes 910, at 1035. The TAZ factor-cubes 910 are used to train the 2D CNN and the RNN, that is, to automatically and dynamically generate bias factors to be used for predicting the demand. As described earlier, the backpropagation error during the training is used for the auto-encoder, at 1045.

The combination of the 2D CNN and the RNN thus trained is then used to generate the prediction by inputting a set of parameter values. Inputting the parameter values may include the forecasting server 140 accessing the parameter values from the data repositories 410-430. Based on the bias factors that were generated during the training, the forecasting server 140 generates a prediction for the demand. For example, the output prediction of the combination of neural networks 485 may be a matrix that predicts the demand in each zone of the geographic region for an input timeslot, based on the parameter values at one or more earlier timeslots. Further, the prediction includes the gap that represents a number of riders 105 that did not receive a ride within a predetermined time after making or sending a ride request.

Figure 11:
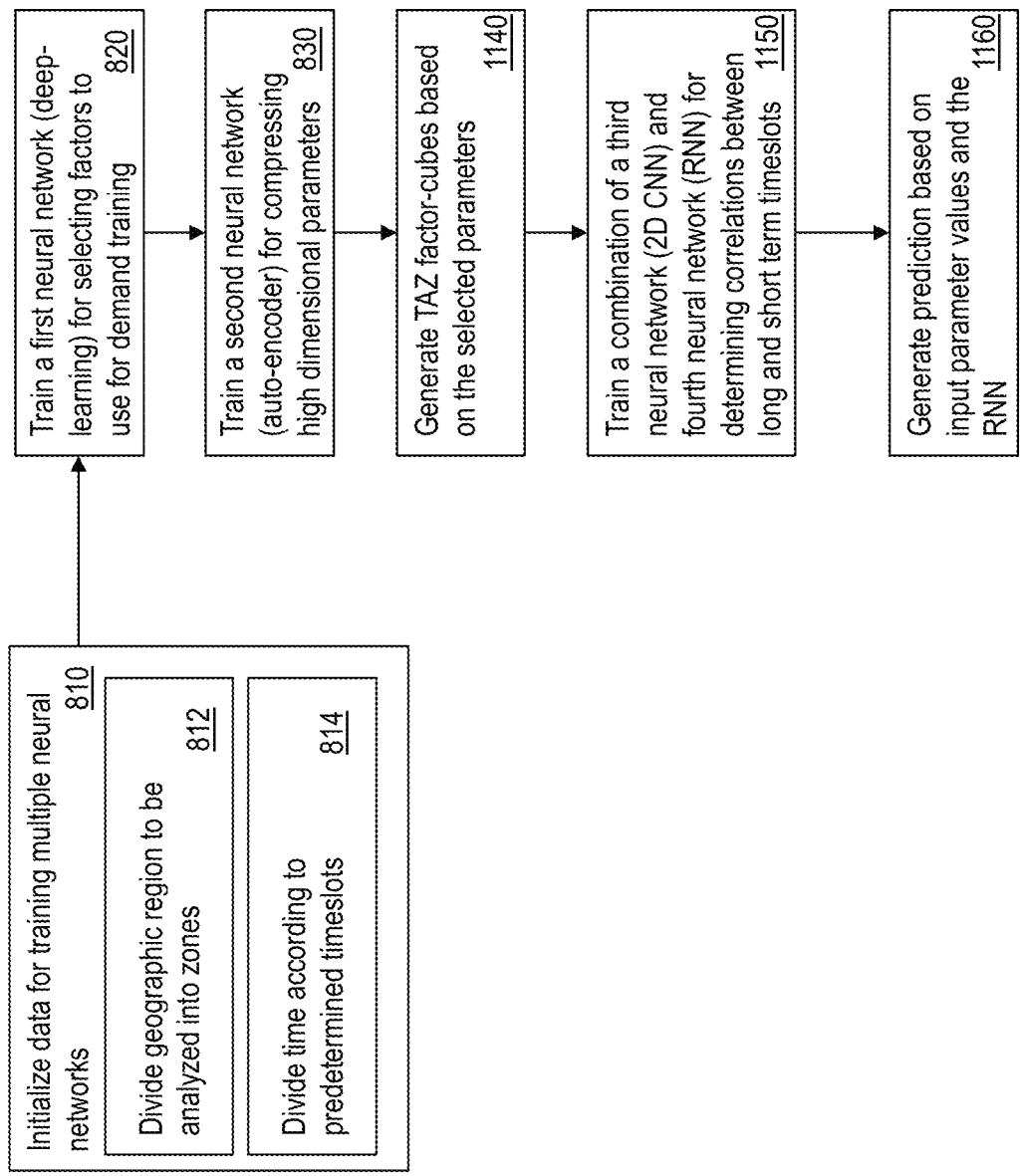
FIG. 11 illustrates a flowchart of an example method for travel demand prediction using the neural networks depicted in FIG. 9, in accordance with one or more embodiments.

FIG. 11 illustrates a flowchart of an example method for travel demand prediction using the neural networks depicted in FIG. 9, in accordance with one or more embodiments. The method may use a combination of multiple neural networks 485 using a combination of the 2D CNN and the RNN. In one or more examples, the forecasting server 140 implements the method. The method includes initializing data for training the multiple neural networks 485, as shown at 810 and described herein. The method further includes training a first neural network for selecting, from the data repositories 410-430, parameters to use for demand training (training the 2D CNN and RNN), as shown at 820. The first neural network, as described above, may use an architecture for deep learning, such as a typical perceptron model, with an input layer, an output layer, and one or more hidden layers. Further, the method includes compressing one or more high-dimensional parameters, from those selected. The compressing of the high-dimensional parameters includes training and using a second neural network, such as an auto-encoder, as shown at 830. The auto-encoder may include using backpropagation errors that are generated during the demand training.

Further, the method includes generating the TAZ factor-cubes 910 based on the selected parameters, as shown at 1140. The dimensions of the TAZ timeslot-cubes 610 depend on the number of zones, and the number of selected parameters (k). The cube generator 475 generates as many TAZ factor-cubes 910 as the number of timeslots (n) in a day or any other predetermined observation period. Each cube includes as many matrices as a number of factors, each matrix representing the zones of the geographic region and a corresponding timeslot.

Further, the method includes training a combination of a 2D CNN and RNN. Thus, the method includes training a third neural network, the 2D CNN, and a fourth neural network, the RNN, as shown at 1150. The combination is trained for determining long and short dependencies of timeslots. Once the combination of the neural networks has been trained, the method includes generating prediction(s) based on input parameter values, as shown at 1160.

Thus, the above example implementation trains and uses the neural networks 485 for generating the prediction for the ride request demand based on long and short term timeslot correlations that are modeled by the combination of the 2D CNN and the RNN automatically by computing the bias factors using the TAZ factor-cubes 910.

Figure 12:
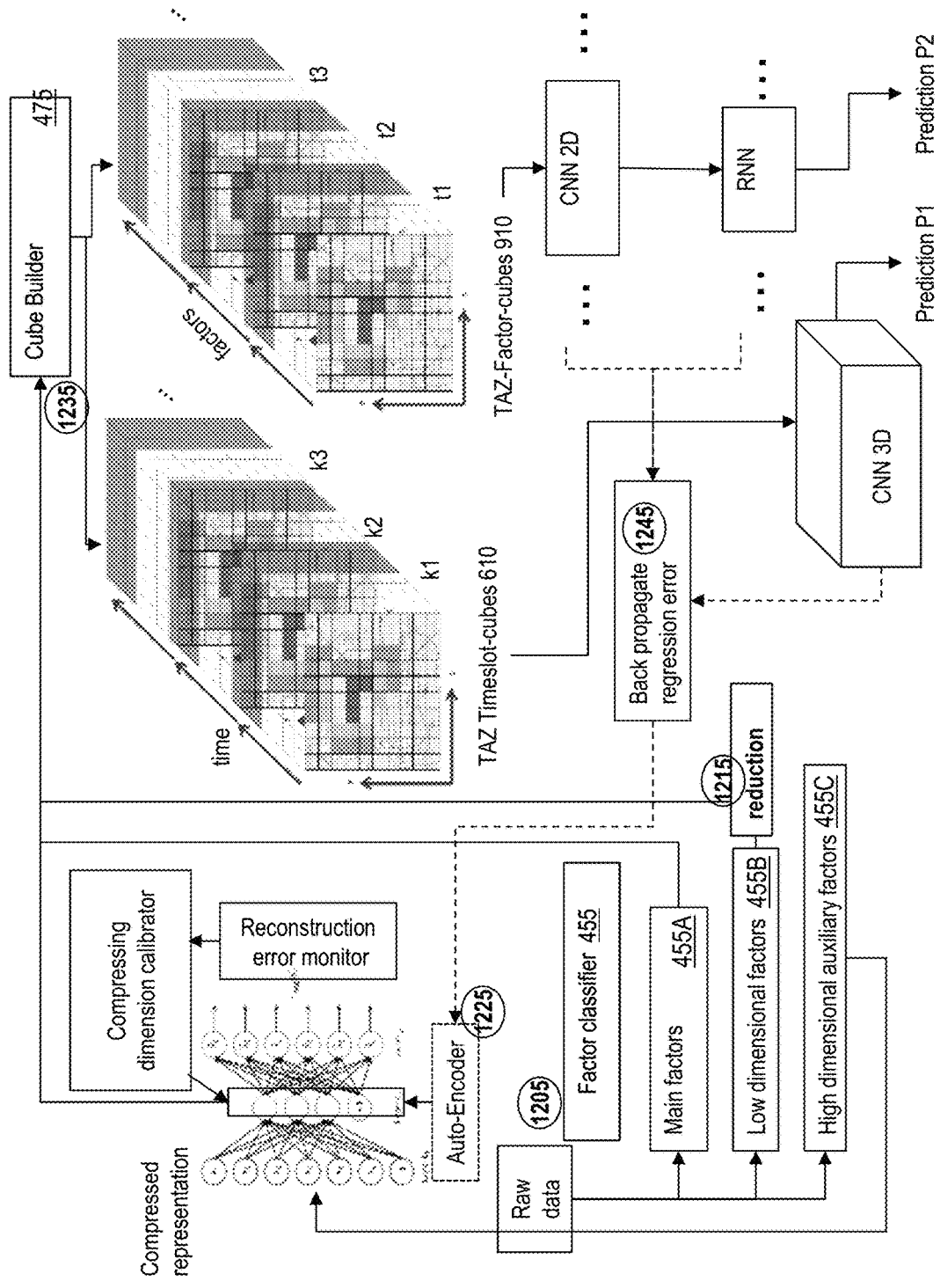
FIG. 12 illustrates another flow diagram for travel demand, in accordance with one or more embodiments.
Figure 13:
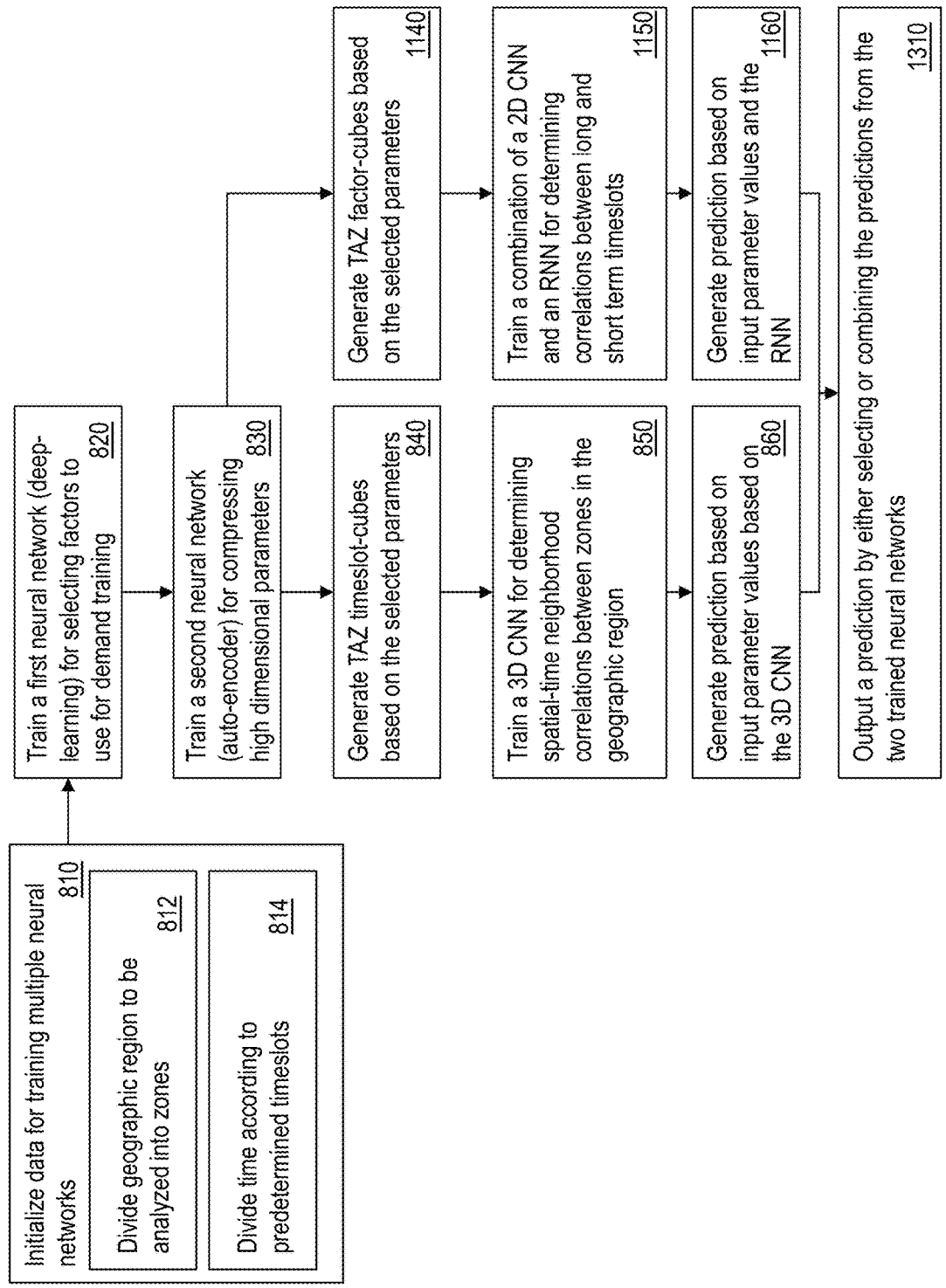
FIG. 13 illustrates a flowchart of another example method for travel demand prediction, in accordance with one or more embodiments.

In yet another example implementation, the forecasting server 140 uses a combination of the 3D CNN and the pair of the 2D CNN and the RNN for generating the prediction. FIG. 12 illustrates such an example implementation with a dataflow, which is a combination of the dataflows described earlier herein. FIG. 13 illustrates a flowchart of such an example implementation, which may be implemented by the forecasting server 140.

Referring to FIG. 13, the method includes initializing data for training the multiple neural networks 485, as shown at 810, and described herein. The method further includes training a first neural network for selecting, from the data repositories 410-430, parameters to use for demand training (training the 2D CNN and RNN), as shown at 820. Referring to FIG. 12, this may be performed by the factor classifier 455. The first neural network, as described above, may use an architecture for deep learning, such as a typical perceptron model, with an input layer, an output layer, and one or more hidden layers. Further, the method includes compressing one or more high-dimensional parameters, from those selected. The compressing of the high-dimensional parameters includes training and using a second neural network, such as an auto-encoder 465, as shown at 830. The auto-encoder may include using backpropagation errors that are generated during the demand training. Referring to FIG. 12, the auto-encoder 465 may compress the factors as shown at 1225.

As illustrated, in this case, the cube builder 475 generates two sets of TAZ cubes, the TAZ timeslot-cubes 610 and the TAZ factor-cubes 910, as shown at 840 and 1140 (see 1235 in FIG. 12). The TAZ timeslot-cubes 610 are used for training the 3D CNN for modeling spatial-time neighborhood correlations as described earlier, as shown at 850. The 3D CNN is then used to generate a prediction P1 for the demand, as shown at 860. Further, the TAZ factor-cubes 910 are used for training the RNN (and 2D CNN) for modeling long and short dependencies of timeslots as described earlier, as shown at 1150. The RNN is used for generating a second prediction P2 for the demand, as shown at 1160.

The combination of the two neural networks (3D CNN, and RNN) creates a hybrid deep learning architecture that reduces the high-dimensionality according to final regression task and reduces compression loss at the same time. In one or more examples, only the back propagation from the RNN training is used by the auto-encoder (S3) when reducing high dimensionality, at block 830.

The forecasting server 140 outputs a prediction by either selecting or combining the predictions from the two trained neural networks, as shown at 1310. For example, in one or more examples, only the prediction P1 from the 3D CNN is used as the prediction for the demand, and the back propagation errors from one or both of the training are used for the auto-encoder training (see 1245 in FIG. 12). Alternatively, only the prediction P2 from the RNN is used as the prediction for the demand, and the back propagation errors from one or both of the training are used for the auto-encoder training.

Alternatively, the predictions P1 and P2 from each of the trained neural networks, the 3D CNN and the RNN, respectively, are combined to generate an output prediction. In one or more examples, the two predictions may be combined by averaging, weighted averaging, or using any other technique to combine the two predictions.

Figure 14:
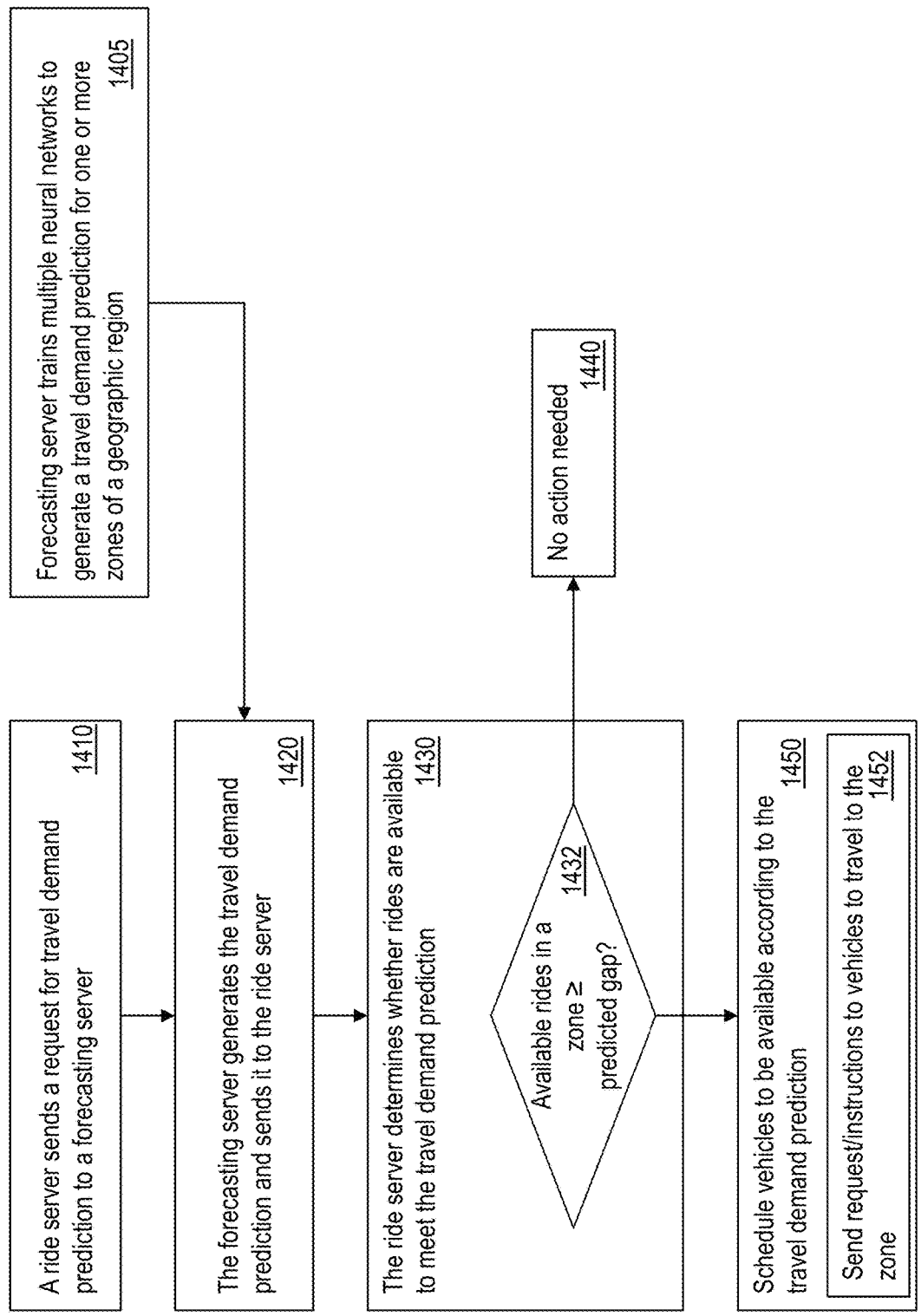
FIG. 14 illustrates a flowchart of an example method for minimizing a wait time of a traveler, in accordance with one or more embodiments.

FIG. 14 illustrates a flowchart of an example method for minimizing a wait time of a traveler, in accordance with one or more embodiments. For example, the ride server 120 sends a request for travel demand prediction to the forecasting server 140, as shown at 1410. In one or more examples, the request includes a specific timeslot for which to generate the prediction. Further yet, the request may include a specific zone in the geographic region for which to generate the prediction.

The forecasting server 140 trains the multiple neural networks 485 to generate a travel demand prediction for the one or more zones of the geographic region, as shown at 1405. In one or more examples, the forecasting server 140 periodically retrains the multiple neural networks based on changing parameters and ride request behaviors exhibited. For example, the forecasting server 140 may retrain or refine the neural networks 485 every night, or every week, or at any other predetermined frequency. Alternatively, or in addition, the forecasting server 140 retrains the neural networks 485 on demand.

Accordingly, using the trained neural networks 485, and in response to the request from the ride server 120, the forecasting server 140 generates the travel demand prediction and sends it to the ride server 120, as shown at 1420. In one or more examples, the prediction indicates the gap, which represents a number of riders 105 who are predicted not get a ride within a predetermined time since requesting a ride.

The ride server 120 determines whether vehicles are available to meet the travel demand prediction, as shown at 1430. For example, the ride server 120 checks if available vehicles 135 in a zone are greater than or at least equal to the predicted gap, as shown at 1432. If there are a sufficient number of vehicles available in the zone, no action is performed in this regard, as shown at 1440. Else, if the number of available vehicles 135 in the zone is less than the predicted demand, the ride server 120 schedules vehicles 135 to be available according to the travel demand prediction, as shown at 1452. For example, the ride server 120 sends requests/instructions for one or more vehicles 135 to travel to the zone. For example, the request/instruction may be sent to one or more driver devices 130 and/or to one or more autonomous vehicles 135.

Some embodiments of the present invention provide features for automatically learning spatial neighborhood relationship of travel demand in adjacent TAZs and short-long term dependencies of timeslots from raw data in travel demand prediction. In addition, the system facilitates back propagation of regression error to at the same time. According to final regression (prediction) objective, the technical solutions automatically reduce the high-dimensionality of auxiliary factors, and also reduce and control compression loss at the same time. One or more of the technical features facilitate predicting travel demand prediction using multiple neural networks, which may be trained using supervised and unsupervised learning at the same time.

Although examples of the present invention apply neural networks to predicting travel demand, those skilled in the art will understand that neural networks trained using features described herein can be used in or with other applications.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments described herein.

What is claimed is:

1. A system comprising:
   a memory; and
   a processor operably coupled to the memory, the processor configured to:
   receive a ride request, the request being for travel from a starting location to a zone in a geographic region during a specified timeslot;
   predict travel demand based on a number of ride requests to the zone during the specified timeslot, wherein the travel demand is predicted based on a combination of a first prediction from a 3D convolutional neural network (CNN) generated using a first input, and a second prediction from a recurrent neural network (RNN) generated using a second input, the combination of predictions being an average of the first prediction and the second prediction; and
   request transport of one or more vehicles to the zone in response to the predicted number of ride requests when the travel demand is predicted to exceed a number of vehicles in the zone during the specified timeslot;
   wherein:
   the 3D CNN is trained using travel analysis zone (TAZ) timeslot-cubes, wherein a TAZ timeslot cube includes a plurality of matrices, each matrix associated with a predetermined factor, and wherein a first matrix associated with a first predetermined factor includes values of the first predetermined factor for each of the timeslots at each zone of the geographic region; and
   the recurrent neural network (RNN) is trained using travel analysis zone (TAZ) factor-cubes, wherein a TAZ factor-cube includes a plurality of matrices, and wherein a matrix includes values of a corresponding traffic parameter at each zone during a specific timeslot.

2. The system of claim 1, wherein the processor trains the 3D convolutional neural network (CNN), and the recurrent neural network (RNN).

3. A computer program product for minimizing wait times of riders after sending a ride request for a vehicle, the computer program product comprising a non-transitory computer readable storage medium having program instructions embodied therewith, the program instructions executable by a processor to cause the processor to:
   receive a ride request, the request being for travel from a starting location to a zone in a geographic region during a specified timeslot;
   predict travel demand based on a number of ride requests to the zone during the specified timeslot, wherein the travel demand is predicted based on a combination of a first prediction from a convolutional neural network (CNN) generated using a first input, and a second prediction from a recurrent neural network (RNN) generated using a second input, the combination of predictions being an average of the first prediction and the second prediction; and
   request transport of one or more vehicles to the zone in response to the predicted number of ride requests when the travel demand is predicted to exceed a number of vehicles in the zone during the specified timeslot;
   wherein:
   the 3D CNN is trained using travel analysis zone (TAZ) timeslot-cubes, wherein a TAZ timeslot cube includes a plurality of matrices, each matrix associated with a predetermined factor, and wherein a first matrix associated with a first predetermined factor includes values of the first predetermined factor for each of the timeslots at each zone of the geographic region; and
   the recurrent neural network (RNN) is trained using travel analysis zone (TAZ) factor-cubes, wherein a TAZ factor-cube includes a plurality of matrices, and wherein a matrix includes values of a corresponding traffic parameter at each zone during a specific timeslot.

* * * * *